2,927,076
Patented Mar. 1, 1960

2,927,076

STABILIZING SULFONATED PETROLEUM WITH ORGANIC SULFOXIDES

Samuel E. Jolly, Ridley Park, Pa., assignor to Sun Oil Company, Philadelphia, Pa., a corporation of New Jersey No Drawing. Application September 16, 1957
Serial No. 683,954

2 Claims. (Cl. 208—237)

This invention relates to stabilizing sulfonated petroleum, and more particularly to the removal of detrimental materials remaining in sulfonated petroleum after conventional treatment for removal of oil-soluble sulfonic acids.

In the sulfonation of petroleum, oil-soluble and oil-insoluble sulfonic acids are generally produced. The oil-insoluble sulfonic acids are allowed to settle from the oil phase containing dissolved sulfonic acids. In one common manner of operation, the oil phase is then treated to remove the oil-soluble sulfonic acids. This is usually done by neutralizing the sulfonic acids with alkali metal hydroxide, and extracting the neutralized sulfonic acids with an aqueous alcohol solvent, most commonly aqueous isopropanol. The extracted sulfonates are useful for various purposes, such as mineral oil additives, etc.

The oil from which the sulfonates have been extracted not infrequently has unsatisfactory stability in that it forms corrosive acidic materials during subsequent distillation. This undesirable characteristic is attributable to materials remaining in the oil after the sulfonates have been extracted. These materials seem to be acidic in reaction. Thus, they are apparently not neutralized in the conventional operation for neutralization of the oil-soluble sulfonic acids. As a result in part of the presence of these materials, an acidic gas is evolved from the oil upon heating to elevated temperature, e.g. 650° F.

The presence of these materials in the oil from which the sulfonates have been extracted presents a serious problem, since the materials are quite resistant to removal by ordinary refining methods. The instability of the oil frequently causes it to be an unsatisfactory charge stock to conventional distillation operations for the production of lubricating oil fractions. The acidic gases evolved during such distillation are corrosive to the distillation equipment and cause the distillates obtained to have poor color and color stability. The undesirable materials in the oil also make the oil unsatisfactory for many uses in that the emulsifying tendency of the oil is too great.

According to the present invention, a novel manner is provided of removing detrimental materials remaining in sulfonated petroleum after extraction of neutralized oil-soluble sulfonic acids therefrom by means of an alcohol. The removal according to the invention is performed by contacting the oil with an organic sulfoxide, and separating sulfoxide containing extracted materials from the oil.

Organic sulfoxides constitute a recognized class of organic compounds. In R. E. Kirk et al., "Encyclopedia of Chemical Technology," volume 13, pages 353–357 (1954), a disclosure is provided of sulfoxides as a class and specific members of the group. The aliphatic sulfoxides, and particularly dimethyl sulfoxide, are preferred according to the invention. Preferably the aliphatic radicals contain 1 to 8 carbon atoms. Aromatic, cycloaliphatic and cyclic sulfoxides such as cyclotetramethylene sulfoxide, dihydro-1-thiophene oxide, etc. are also capable of being used according to the invention.

The sulfonated petroleum which is treated with sulfoxide according to the invention perferably has Saybolt Universal viscosity at 100° F. of at least 50 seconds. Preferably not more than 5% of the sulfonated petroleum boils below 600° F. Usually it contains not more than 10% of aromatic compounds, i.e. compounds containing one or more aromatic rings in the molecule.

The contacting according to the invention is usually carried out at a temperature within the approximate range from room temperature to 300° F., although other temperatures can be employed if desired. Preferably the temperature is at least about 100° F., and more preferably at least about 150° F., since elevated temperatures promote the solution of undesired materials in the sulfoxide.

The total amount of sulfoxide employed is preferably within the approximate range from 0.2 to 2.0 times the amount of oil treated, though other amounts can be employed in some instances. The total amount may if desired be divided among a plurality of extraction operations. The conditions of the contacting are preferably chosen to provide extraction of less than 10, and more preferably less than 5, weight percent of hydrocarbon material from the oil treated. In the light of the present specification, a person skilled in the art can select proper contacting conditions for providing an optimum extent of removal of undesirable materials while minimizing the extent of extraction of hydrocarbons.

Although the use of a modifying solvent is not essential according to the present invention, it is often desirable to employ a modifying solvent, e.g. water, methanol, ethanol, isopropanol, butanols, pentanols, glycol, acetone, furfural, benzaldehyde, glycol ethers, acetic acid, benzoic acid, butylamine, aniline, toluene, liquid sulfur dioxide, etc., in order to change the miscibility characteristics and improve phase separation. Alkanols, and particularly isopropanol, are preferred modifying solvents, since they provide superior results in many cases.

The following examples illustrate the invention:

Example 1

A furfural-extracted waxy raffinate containing about 12% aromatic compounds and derived from paraffinic-naphthenic base crude is treated with about 24 pounds of anhydrous $SO_3$ per barrel of oil at 165° F. The sulfonation products are stripped with air to remove $SO_2$ and $SO_3$, and settled to separate sour oil from green acid sludge. The sour oil is mixed with about 0.7 volume (based on sour oil) of aviation alkylate and contacted with about 0.34 volume of 35% aqueous isopropanol containing sufficient sodium hydroxide to neutralize the neutralizable components of the oil. The alkylate solution of oil is separated from the aqueous alcoholic solution of sodium sulfonates. Alkylate is stripped from the oil layer to recover as residue an oil having acid gas number of about 0.11 weight percent $H_2SO_4$ based on oil.

Acid gas number is determined by heating the oil to 650° F. in an atmosphere of nitrogen, maintaining the oil at 650° F. for 15 minutes, passing the evolved gases through hydrogen peroxide solution to oxidize $SO_2$ to $SO_3$, then titrating the gases with aqueous sodium hydroxide to determine the amount of acid gas as $H_2SO_4$ evolved from the oil during the heating.

Other typical properties of the oil recovered from the alkylate layer are as follows: A.P.I. gravity 34.7, specific gravity 0.851, Saybolt Universal viscosities at 100° F. of 101 seconds and at 210° F. of 40 seconds, and aromatic content of 6 weight percent.

The oil having acid gas number of 0.11 is intimately contacted at about 120 to 130° F. with 0.2 volume based on this oil of a solvent consisting essentially of dimethyl sulfoxide for 30 minutes. Good layer separation is obtained, and the separated oil after water washing has acid gas number of about 0.08, indicating substantial removal of the acid-gas-evolving materials. In further extractions with dimethyl sulfoxide under the same conditions, still further reduction in acid gas number is obtained, to 0.07 after the second extraction and to 0.06 after the third extraction.

The contacting of oil and sulfoxide can be repeated any desired number of times to obtain the required extent of improvement in properties. Larger ratios of sulfoxide to oil can be employed to obtain the required extent of improvement in fewer extractions. Countercurrent extraction involving a large number of theoretical stages is capable of producing greater improvement than that obtained in the preceding example. The conditions to be employed in a given instance depend on the initial acid gas number of the oil and the acid gas number required in the product. In some cases, the extent of reduction required in acid gas number is not greater than in the preceding example. In instances where a greater reduction is required, suitable conditions to obtain such reduction can be selected, in the light of the discussion herein, by a person skilled in the art.

*Example II*

Similar operation to that in Example I is carried out, employing however a mixture of 0.19 volume of dimethyl sulfoxide and 0.01 volume of water in place of the 0.2 volume of dimethyl sulfoxide employed in Example I. The results with respect to acid gas number are substantially the same as in Example I.

*Example III*

Similar operation to that in Example II is carried out, employing however isopropanol in place of water. The isopropanol contains about 9% water. The acid gas numbers after the first and third extractions are about 0.06 and 0.04 respectively.

In the preceding examples, dimethyl sulfoxide is employed to extract undesirable materials from the oil after separation of the latter from alkylate. Generally similar results are obtained when the contacting with sulfoxide is performed prior to the removal of the diluent such as alkylate. Generally similar results are also obtained employing other organic sulfoxides such as those referred to previously.

After treatment of oil to extract undesirable materials, the sulfoxide in the used treating agent can be separated from the undesirable materials in any suitable manner. Thus for example, in the case of water-soluble sulfoxides such as dimethyl sulfoxide the contaminated sulfoxide can be contacted with water to dissolve the sulfoxide, and the resulting aqueous solution separated from the undesirable materials, which are generally insoluble in water. The excess water can then be separated from the aqueous solution by known means to recover the sulfoxide for further use as treating agent.

The invention claimed is:

1. In a process which comprises contacting petroleum with a sulfonating agent, thereby to form oil-soluble sulfonic acids, neutralizing the sulfonic acids and extracting the neutralized sulfonic acids from the sulfonated petroleum by means of a lower aliphatic alcohol and subsequently heating the petroleum from which the neutralized acids have been extracted to a temperature of at least 650° F., the improvement which comprises reducing the evolution of acidic gases during the heating by contacting the petroleum from which the neutralized acids were extracted with an organic sulfoxide and separating from the petroleum the organic sulfoxide containing constituents which would otherwise cause evolution of acidic gases during the subsequent heating of the petroleum.

2. Process according to claim 1 wherein said sulfoxide is dimethyl sulfoxide.

References Cited in the file of this patent

UNITED STATES PATENTS 2,365,898   Morris et al. _____ Dec. 26, 1944
2,788,310   Wilson et al. _____ Apr. 9, 1957